United States Patent
Belmonte et al.

(10) Patent No.: US 9,759,088 B2
(45) Date of Patent: Sep. 12, 2017

(54) DEVICE FOR DE-ICING A TURBOMACHINE SEPARATOR

(75) Inventors: Olivier Belmonte, Perthes en Gatinais (FR); Jacques René Bart, Soisy sur Seine (FR)

(73) Assignee: SNECMA, Paris (FR)

( * ) Notice: Subject to any disclaimer, the term of this patent is extended or adjusted under 35 U.S.C. 154(b) by 762 days.

(21) Appl. No.: 14/118,092

(22) PCT Filed: May 15, 2012

(86) PCT No.: PCT/FR2012/051077
§ 371 (c)(1),
(2), (4) Date: Nov. 18, 2013

(87) PCT Pub. No.: WO2012/156637
PCT Pub. Date: Nov. 22, 2012

(65) Prior Publication Data
US 2014/0072405 A1    Mar. 13, 2014

(30) Foreign Application Priority Data
May 16, 2011    (FR) ...................................... 11 54249

(51) Int. Cl.
*F01D 25/02* (2006.01)
*F02C 7/047* (2006.01)

(52) U.S. Cl.
CPC .............. *F01D 25/02* (2013.01); *F02C 7/047* (2013.01); *F05D 2260/30* (2013.01)

(58) Field of Classification Search
CPC .. F02C 7/04; F02C 7/047; F01D 25/02; F01D 25/08; F01D 25/10; F01D 25/145;
(Continued)

(56) References Cited

U.S. PATENT DOCUMENTS

| 2,686,631 A | * | 8/1954 | Jordan | ...................... F02C 7/04 415/116 |
| 2,712,727 A | * | 7/1955 | Morley | ................... F02C 7/047 244/134 R |

(Continued)

FOREIGN PATENT DOCUMENTS

| EP | 0 918 150 | 5/1999 |
| FR | 2 859 500 | 3/2005 |
| FR | 2 921 901 | 4/2009 |

OTHER PUBLICATIONS

International Search Report as issued for International Application No. PCT/FR2012/051077, dated Sep. 6, 2012.

*Primary Examiner* — Dwayne J White
*Assistant Examiner* — Joshua R Beebe
(74) *Attorney, Agent, or Firm* — Pillsbury Winthrop Shaw Pittman LLP

(57) ABSTRACT

A turbomachine separator including a device for de-icing the turbomachine separator, and a distribution element, wherein the separator is formed by an inner ferrule and an outer ferrule, wherein the inner ferrule is fitted with a first mounting flange and a second mounting flange, the de-icing device including an internal air supply duct, able to inject air into the separator, wherein the internal supply duct is connected to an air inlet, wherein the air inlet forms a projection external to the de-icing device, allowing a flexible connection with a tube of the distribution element for conveying hot air, a first fastener constructed and arranged to be attached to the first mounting flange; and a second fastener constructed and arranged to be attached to the second mounting flange.

12 Claims, 4 Drawing Sheets

(58) Field of Classification Search
CPC .............. F01D 5/143; F04D 29/584; B64D 2033/0233; B64D 15/00; B64D 15/04; F05D 2260/30
See application file for complete search history.

(56) References Cited

U.S. PATENT DOCUMENTS

| | | | | |
|---|---|---|---|---|
| 2,746,671 A * | 5/1956 | Newcomb | ............... | F01D 3/00 415/104 |
| 2,832,528 A * | 4/1958 | Spears, Jr. | ............. | F02C 7/047 138/34 |
| 3,303,669 A * | 2/1967 | Oetiker | ............... | F16L 33/006 24/20 CW |
| 4,193,435 A * | 3/1980 | Frosch | ............... | F16B 37/044 411/103 |
| 4,312,101 A * | 1/1982 | Oetiker | ............... | F16L 33/025 24/20 CW |
| 4,351,150 A * | 9/1982 | Schulze | ............... | F01D 17/085 60/226.1 |
| 4,782,658 A * | 11/1988 | Perry | ..................... | F02C 7/047 60/226.1 |
| 5,085,559 A * | 2/1992 | Stoffer | ..................... | F01D 5/18 244/134 R |
| 2003/0035719 A1* | 2/2003 | Wadia | ..................... | F01D 25/02 415/145 |
| 2003/0135962 A1* | 7/2003 | Tran | ..................... | F16L 55/172 24/279 |
| 2011/0011981 A1* | 1/2011 | Vauchel | ............... | B64D 33/02 244/134 B |

* cited by examiner

DEVICE FOR DE-ICING A TURBOMACHINE SEPARATOR

CROSS-REFERENCE TO RELATED APPLICATIONS

This is the U.S. National Stage of PCT/FR2012/051077, filed May 15, 2012, which in turn claims priority to French Patent Application No. 1154249, filed May 16, 2011, the entire contents of all applications are incorporated herein by reference in their entireties.

TECHNICAL FIELD

The present invention relates to a device for de-icing the front portions of a turbomachine, and more specifically the separator of a turbomachine. The invention also relates to a de-icing nozzle fitted with such a de-icing device, together with a turbomachine including such a de-icing device.

STATE OF THE PRIOR ART

During flight aircraft experience very diverse atmospheric conditions. These conditions differ according to the geographical locations, the seasons and also the flight altitude. Under "icing" conditions, turbojets draw in damp, cold air which will cause ice to form on certain components.

Different parameters and different characteristics will restrict or increase the size of the formed ice mass. The components located at the front of the turbomachine, in particular the separator, are sensitive to ice and are not subject to, or are not sufficiently subject to, the effects of the centrifugal force which may protect them from a substantial accumulation of ice during a prolonged flight in icing atmospheric conditions.

A solution habitually used to limit the consequences of ice, and to de-ice the parts, consists in using a system involving heating using the hot air which is drawn from the turbomachine' compressor.

To do so the state of the art proposes to insert into the separator an air inlet duct which injects air from the high-pressure compressor into the separator.

However, separators are of increasingly small dimensions, such that it is increasingly difficult to insert ducts into the separator. Particularly since the separator's internal space is already occupied by a centring diameter which enables the outer ferrule of the separator to be centred relative to the inner ferrule of the separator.

When this centring diameter has been installed in the separator the space left free for the air inlet duct is consequently small, such that the quantity of air from the high-pressure compressor which can be injected into the separator is limited. The de-icing efficiency of the separator is consequently reduced when the separator dimensions are reduced.

ACCOUNT OF THE INVENTION

The invention seeks to remedy the disadvantages of the state of the art by proposing a device for de-icing a turbomachine separator which efficiently de-ices the separator, even if it is of small dimensions.

To accomplish this, according to a first aspect of the invention, a device is proposed for de-icing a turbomachine separator, where the separator is formed by an inner ferrule and an outer ferrule, where the inner ferrule is fitted with a first mounting flange and a second mounting flange, and where the de-icing device includes:

an internal air supply duct, able to inject air into the separator, where the said internal supply duct is connected to an air inlet (21), where the air inlet (21) forms a projection external to the de-icing device (16), allowing a flexible connection with a tube for conveying hot air;

first attachment means able to be attached to the first mounting flange;

second attachment means able to be attached to the second mounting flange.

The invention allows flexible fitting between an intermediate tube or an air conveyance tube with the de-icing device. The de-icing device advantageously forms a bridge clamp allowing a simple assembly, which is sufficiently robust to hold the tube in place and to enable a portion of the forces of the parts which are deformed under the effect of thermal expansion to be absorbed.

In addition, the flexible connection is made by fitting an air conveyance tube into the inlet of the de-icing device. The flexible connection is advantageously produced by means of a seal fitted in the air inlet such that the tube is fitted and held directly in the seal. The device forms a bridge clamp enabling a tube of diameter smaller than the diameter of the air inlet to be inserted.

The de-icing device advantageously includes attachment means on its upper outer wall. The upper wall is disposed such that the outer ferrule may be attached such that it is supported on this upper outer wall;

The invention thus proposes to eliminate the centring diameter of the separator and the air inlet duct, which were two separate parts in the prior art, and to replace these two separate parts of the prior art by the de-icing device according to the invention, which simultaneously enables air to be injected into the separator, and the outer ferrule to be centred relative to the inner ferrule. The fact that a single part is used, instead of two parts, thus enables space to be gained within the separator, which enables larger quantities of air to be injected into the separator, even when the latter is smaller, leading to efficient de-icing. Indeed, unlike the de-icing nozzles of the prior art, in which it was necessary to provide a space in the separator for the centring diameter, according to the invention it is proposed to eliminate the centring diameter and to use the outer surface of the inner supply duct to accomplish the centring. The de-icing device therefore simultaneously enables the separator to be centred, and the air to be conveyed in the thinnest area of the separator. The first function of centring is therefore accomplished by the outer portion of the de-icing device, while the de-icing function is accomplished by the inner portion of the de-icing device. For a given separator dimension, the inner air supply duct can therefore be of larger dimensions than in the prior art, such that the de-icing is more efficient.

The de-icing device according to the invention may also have one or more of the characteristics below, considered individually, or in all possible technical combinations.

According to one embodiment the inner air supply duct has an oblong section, enabling a large quantity of air to be injected into the separator, whilst having a shape which is suitable for the inner space of the separator.

The de-icing device preferably has an oblong section, such that it has a shape suitable for the inner space of the separator, and such that it is able to inject as much air as possible into the separator. In addition, the fact that the de-icing device has a broad upper surface allows a large supporting surface to be obtained for the outer ferrule, so as to improve its centring and its attachment.

The de-icing device according to the invention preferably has an air inlet connected to the inner air supply duct, where the air inlet can be connected to means to draw air from a compressor of the turbomachine. The air inlet is preferably of standard dimensions, i.e. dimensions similar to the dimensions of the air inlets of the de-icing devices of the prior art, in order that this air inlet may be connected to de-icing air drawing means which already exist.

The air inlet advantageously has a cylindrical section, to facilitate fitting on to the tubes to which it must be connected.

According to one embodiment each fastener includes two retaining brackets, each of which has a hole in it.

Each retaining bracket is preferably disposed such that, when the said retaining bracket is supported against the inner ferrule, the hole of the said retaining bracket is aligned with a hole of one of the mounting flanges.

According to one embodiment, the upper outer wall has two apertures, where each aperture is able to accept a captive nut. The two apertures enable the outer ferrule to be attached to the upper outer wall of the de-icing device. The fact that the apertures can accept captive nuts is particularly advantageous, since by this means the outer ferrule may be attached to the de-icing device, even if its upper outer wall is not easily accessible.

The de-icing device is preferably produced using the lost wax technique, due to the many cavities it contains.

Another aspect of the invention also relates to a separator including a de-icing device according to the first aspect of the invention.

The separator advantageously includes an outer ferrule formed by several panels, where at least a proportion of these panels is assembled with one another through the de-icing device. The de-icing device thus not only enables air to be injected into the separator, and the outer ferrule to be centred, but also enables the panels of the outer ferrule to be assembled. By this means an economy is made of the number of assembly components used.

The separator preferably includes several de-icing devices according to the first aspect of the invention.

These de-icing devices are preferably distributed circumferentially in the de-icing nozzle.

Multiple de-icing devices are advantageously positioned between two flanges at different circumferential positions, so as to convey air into the nozzle through different air inlets.

A circumferential distribution element advantageously includes multiple air outlets, enabling multiple de-icing devices to be supplied with air, and including multiple inlets to connect multiple air conveyance tubes. This configuration enables the air to be distributed uniformly in the separator.

The distribution element is preferentially a circumferential tube encircling a ring of the stator close to one end of the secondary flange.

A third aspect of the invention also relates to a turbomachine including a separator according to one of the aspects of the invention.

BRIEF DESCRIPTION OF THE FIGURES

Other characteristics and advantages of the invention will be seen clearly on reading the detailed description below, with reference to the appended figures, which illustrate.

For greater clarity, identical or similar elements are identified by identical reference signs in all the figures.

DETAILED DESCRIPTION OF AT LEAST ONE EMBODIMENT

Figure 1:
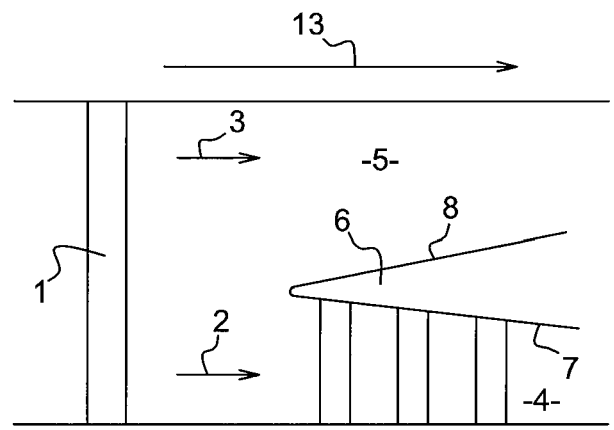
FIG. 1, a section view of a turbomachine in which a de-icing device according to one embodiment of the invention may be installed.

FIG. 1 represents a section view of a turbomachine in which the de-icing device according to the invention is preferably installed.

The turbomachine extends along a reference axis 13. In this document the term "axial" is used to designate a direction parallel to this reference axis, and the term "radial" is used to designate a direction perpendicular to this reference axis.

This turbomachine includes a first fan 1, behind which the air stream is separated into a primary stream 2 which flows in a primary flow path 4 and a secondary stream 3 which flows in a secondary flow path 5. Primary stream 2 and secondary stream 3 are separated by a separator 6 represented more accurately in FIG. 2. This separator 6 is formed by the intersection of an inner ferrule 7 and an outer ferrule 8. Inner ferrule 7 is formed by the assembly of rings 9a, 9b, 9c which are able to support rotor blades or flow straighteners. First ring 9a is assembled with second ring 9b using a first mounting flange 10a. Second ring 9b is assembled with third ring 9c using a second mounting flange 10b. First mounting flange 10a is formed by a shoulder 11a of first ring 9a axially supported against a shoulder 11b of second ring 9b. Both these shoulders 11a, 11b have holes in them and are assembled by a screw-nut system 14a installed in these holes. Second mounting flange 10b is formed by a shoulder 12a of second ring 9b axially supported against a shoulder 12b of third ring 9c. Both these shoulders 12a, 12b have holes in them and are assembled by a screw-nut system 14b installed in these holes. Outer ferrule 8 is formed by several plates 15a, 15b, 15c which are screwed on to one another.

As explained above, outer ferrule 8 must be centred relative to inner ferrule 7. In addition, it is advantageous to inject air from the high-pressure compressor into separator 6 in order to de-ice it in the event of icing conditions.

Figure 3:
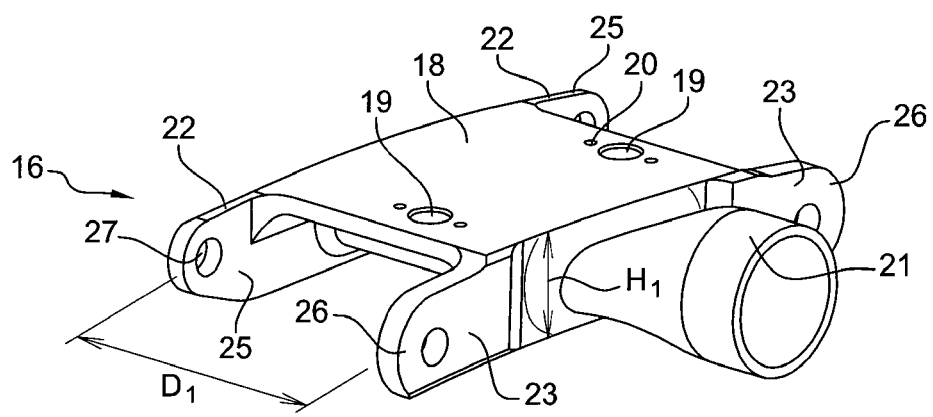
FIG. 3, a perspective view of a de-icing device according to one embodiment of the invention.
Figure 4:
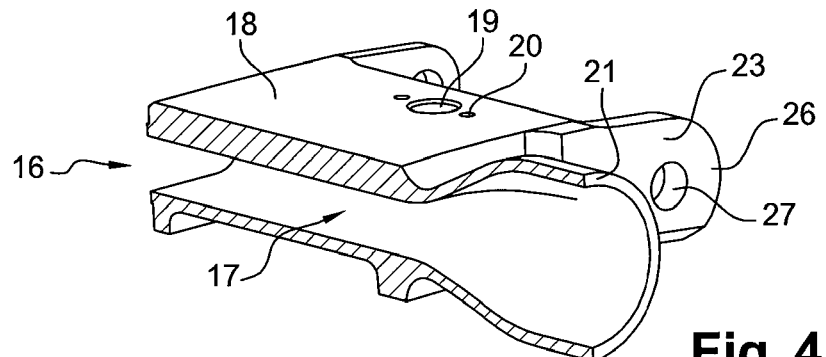
FIG. 4, a section view of the device of FIG. 3.

To do so a de-icing device 16, represented in FIGS. 3 and 4, is proposed. This de-icing device includes an inner air supply duct 17, able to inject air into separator 6. This inner air supply duct 17 has an oblong transverse section. Inner air supply duct 17 is connected to an air inlet 21 which preferably has a cylindrical section, and into which air supply tubes from the high-pressure compressor can be fitted. The sections of inner air supply duct 17 and of air inlet 21 can be adjusted according to the flow rate of the air which it is desired to inject into the separator.

Inner air supply duct 17 has an upper outer wall 18 which forms upper outer wall 18 of the de-icing device. This upper outer wall 18 is preferably shaped such that a panel 15b of outer ferrule 8 is able to be supported radially on this upper outer wall 18.

This upper outer wall 18 preferably has at least two apertures 19 in it, able to accept captive nuts. Each of these apertures 19 is surrounded by two holes 20 enabling the captive nut to be tightened when it is in aperture 19.

De-icing device 16 also preferably includes first fasteners 22 able to be attached to first mounting flange 10a and second fasteners 23 able to be attached to second mounting flange 10b. Each fastener 22, 23 includes two retaining brackets 25, 26, each of which has a hole 27 in it. Each retaining bracket 25, 26 is disposed such that, when said retaining bracket 25, 26 is radially supported against inner ferrule 7, hole 27 of said retaining bracket 25, 26 is aligned with a hole of one of mounting flanges 10a, 10b. Distance 01 between first fasteners 22 and second fasteners 23 is roughly equal to distance 02 between first mounting flange 10a and second mounting flange 10b, such that the de-icing device may be inserted between the two mounting flanges 10a, 10b and such that, when the de-icing device is inserted between the two mounting flanges 10a, 10b, fasteners 22, 23 are axially supported against mounting flanges 10a, 10b.

The de-icing device is therefore dimensioned such that it is radially supported on second ring 9b, between the two mounting flanges 10a, 10b.

Figure 5:
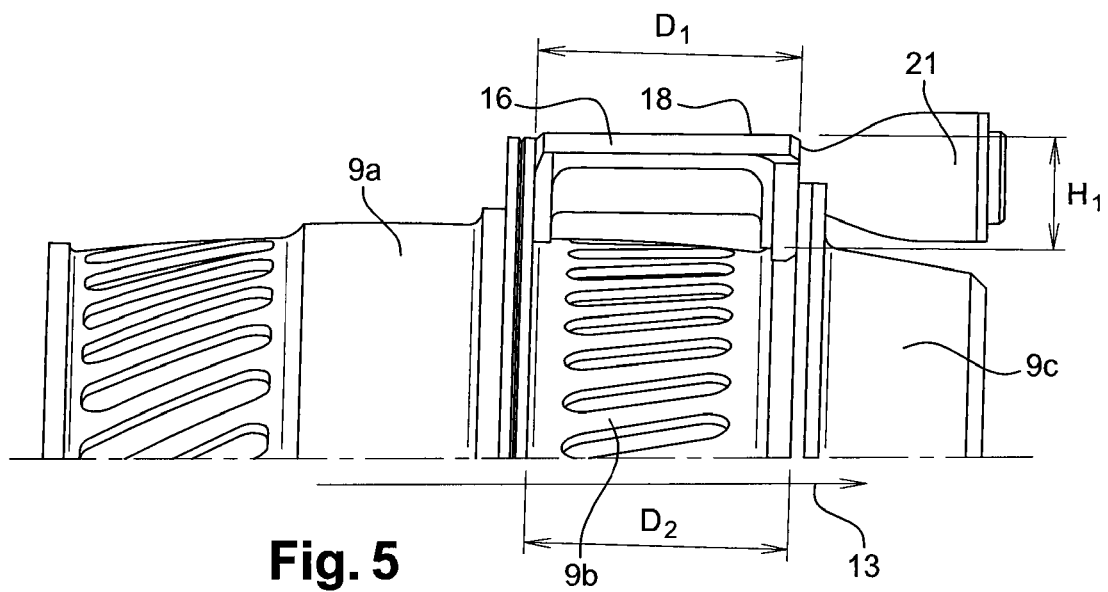
FIG. 5, a side view of the inner space of the de-icing nozzle of FIG. 2 in which the de-icing device of FIG. 3 has been installed.
Figure 6:
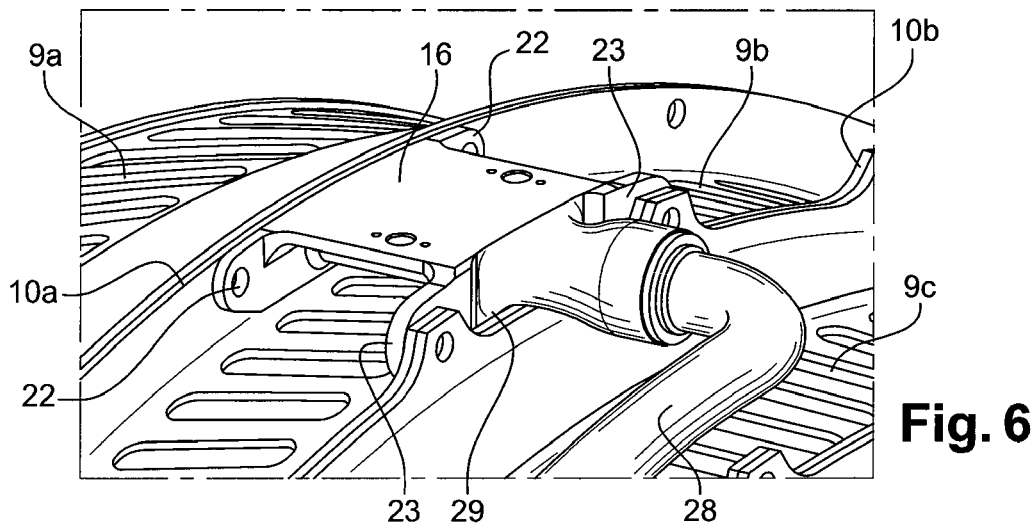
FIGS. 6 to 8, the different steps for attaching the outer ferrule of the separator on to the de-icing device of FIG. 3.

As is represented in FIGS. 5 and 6, air inlet 21 is preferably positioned such that, when retaining brackets 25, 26 are radially supported against second ring 9b, air inlet 21 passes above second mounting flange 10b, such that the air inlet is above third ring 9c. To accomplish this, second mounting flange 10b is preferably cut locally so as to have local recesses 29 enabling air inlet 21 to be passed above second flange 10b.

Given the shape of the de-icing device, the latter is preferably made by a casting process, such as the lost wax technique.

Figure 2:
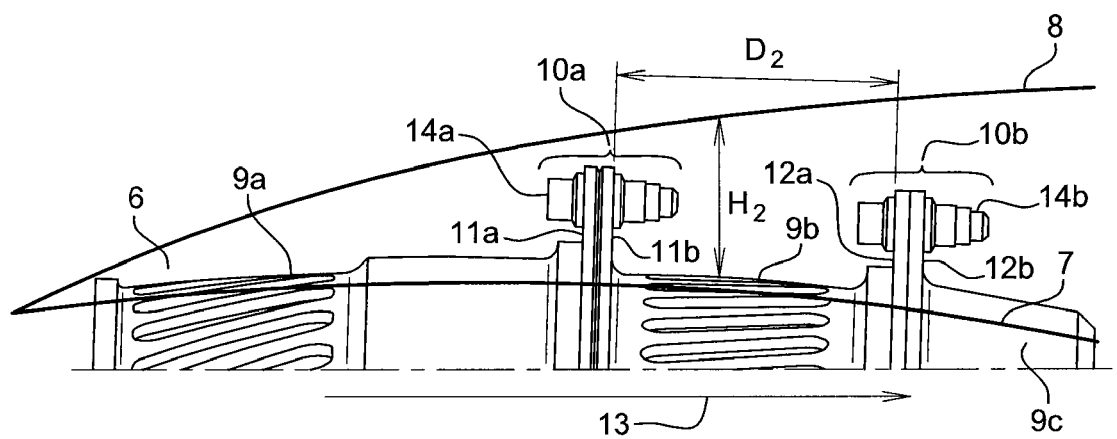
FIG. 2, a schematic section view of the separator of the turbomachine of FIG. 1.
Figure 7:
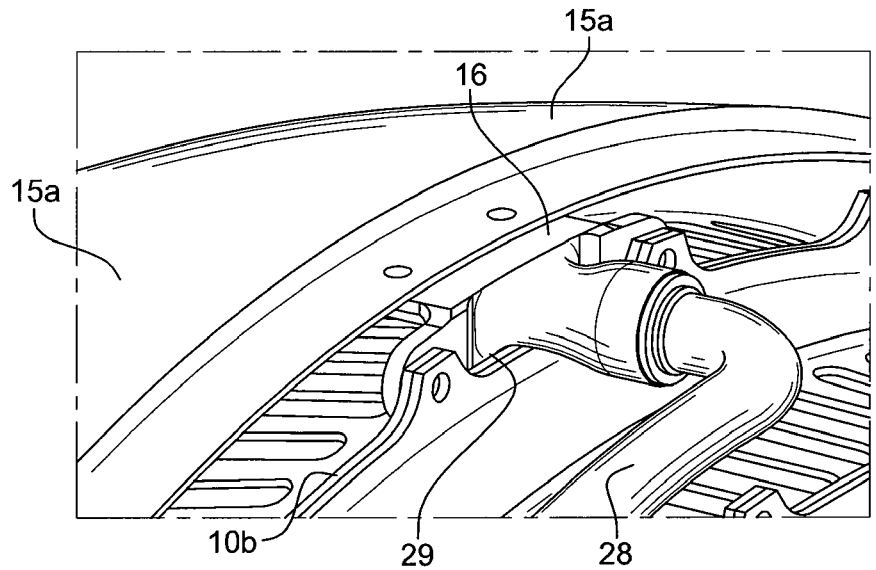
Figure 8:
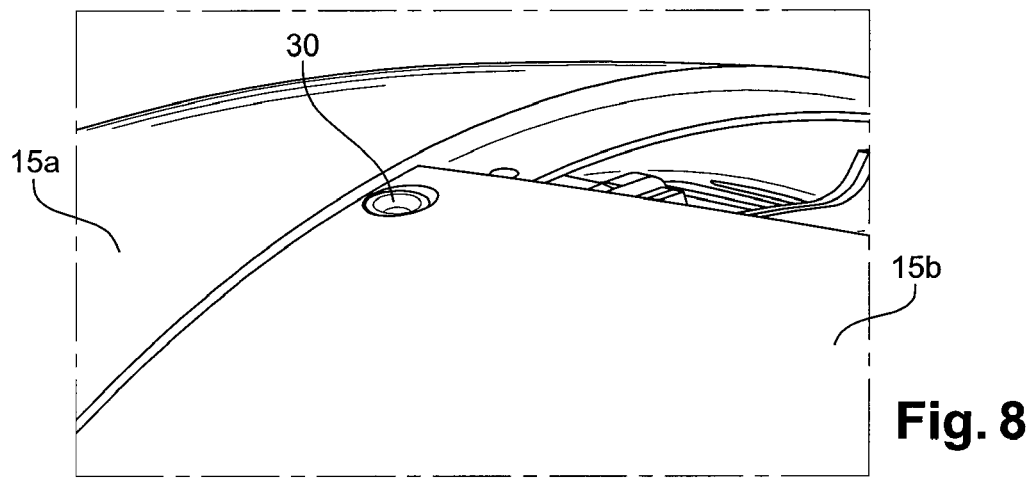

Attachment of the de-icing device of FIGS. 3 and 4 in the separator of FIG. 2 is now described with reference to FIGS. 6 to 8. De-icing device 16 is therefore installed radially supported on second ring 9b. The de-icing device is coupled with mounting flanges 10a, 10b by means of screw-nut systems which traverse both the holes of the mounting flanges and those of retaining brackets 22, 23.

A tube 28 supplying the air from the high-pressure compressor is then fitted to air inlet 21 of de-icing device 19 (FIG. 6). Panels 15a which form the front part of outer ferrule 8 are then positioned radially supported on upper outer wall 18 of de-icing device 16 (FIG. 7). Panels 15b, which form a portion of outer ferrule 8, are then installed radially supported on upper outer wall 18 of the de-icing device. Captive screws 30 are then inserted so as to assemble panels 15a and 15b and de-icing device 16. Panels 15a and 15b are thus assembled with one another through de-icing device 16, enabling the number of assembly parts used to be reduced.

When it has been installed in the separator, de-icing device 16 is therefore completely included in the space inside the separator. The de-icing device therefore has a height H1 which is less than height H2 of the inner space of the separator in second ring 9b.

In addition, outer ferrule 8 formed by panels 15a, 15b is centred by means of the de-icing device.

De-icing devices 16 such as the one described with reference to FIGS. 3 and 4 are preferably installed in the separator over the entire circumference of the separator. Six de-icing devices 16 are thus preferably installed in the separator. To achieve efficient de-icing only four of these six de-icing devices need be connected to tubes supplying air from the high-pressure compressor. The other two de-icing devices 16 are used only for attaching panels 15a, 15b and for centring outer ferrule 8. Local recesses 29 in the second mounting flange are preferably made only at the places where an air inlet 21 of a de-icing device passes.

The de-icing device according the invention therefore enables, simultaneously in a single piece, the separator to be centred, but also a large quantity of air to be conveyed into the separator.

The invention is of course not limited to the embodiments described with reference to the figures, and variants could be envisaged without going beyond the scope of the invention. In particular, the number and shape of the parts which form the separator are not restrictive. It could also be imagined to have more or fewer de-icing devices in the separator.

Furthermore, the de-icing device has been described in detail in the event that it enables a separator to be de-iced. However, the de-icing device according to the invention could also be used to de-ice, in addition, the flow straightener blades juxtaposed with the separator.

In one preferred embodiment of the invention, the device for de-icing a separator includes an air inlet 21 forming an annular outer projection. The projection forms an aperture allowing a gas to enter. The shape of the inlet may be oblong, circular or again reniform. The air inlet forms a bridge clamp enabling an air conveyance tube to be fitted for de-icing the separator.

The average diameter of the air inlet of the de-icing device performing a projection is advantageously appreciably larger than the average diameter of the tube, so as to allow simple fitting, and permitting relative flexibility, notably to allow a clearance of the mechanical parts. The tubes may be interconnected simply by being slid into one another. This configuration enables a proportion of the load transfers being exerted on the de-icing device to be absorbed.

In one embodiment the junction of the air inlet of the de-icing device and the tube may include a seal. This allows a clearance between the different elements. In addition, one advantage is that the clearance allows a mechanical tolerance, and permits a deformation so as to withstand stresses being exerted on the parts, for example during temperature variations.

Finally, the use of a flexible junction, for example the use of a seal, allows adaptation to a wide temperature range. Indeed, use of a seal enables a proportion of the forces of the parts subject to expansion when the temperature is high to be absorbed.

This effect is equivalent to other flexible fasteners allowing a certain clearance between the parts, including notably the air conveyance tube and the air inlet of the de-icing device.

The term flexible junction is understood to mean a junction allowing a mechanical clearance between the hot air conveyance tube and the air inlet of the de-icing device.

In addition, the use of a seal enables a suitable attachment to be produced for the tube to remain in the air inlet, and one which is sufficiently flexible to allow expansion of the parts if the temperature rises. In particular, the seal may be chosen so as to allow a temperature variation of up to 250° C.

The de-icing device according to the invention allows the use of small diameter tubes which are fitted into the bridge clamp such that the de-icing device allows lesser encumbrance near the separator between inner ferrule 7 and outer ferrule 8.

According to one variant embodiment it is possible to attach multiple de-icing devices on a ring such that they are distributed throughout the circumference of the said ring. These devices may be attached at different positions on the ring, depending on the envisaged configuration. The fasteners used in connection with the use of several de-icing devices may be those described above. Depending on the size of the turbomachine and the design of the separator, this flexibility enables the number of de-icing devices and their distribution around a ring between two ferrules to be modified.

One advantage is that this enables the injected air stream to be distributed uniformly in order to de-ice the separator over the entire circumference of the said separator. One advantage is that this zone is heated uniformly, in order not to cause excessive temperature differences at different locations close to the separator. Another beneficial effect is that the conveyance tubes may consequently be increased tenfold over the entire circumference of the ring, depending on the number of de-icing devices which are attached. The conveyance tubes may thus have a smaller diameter than if a single air conveyance tube were used. It is then possible to use tubes of small diameters, notably less than 25.4 mm.

This embodiment is particularly well suited to fine separators.

In this final embodiment an intermediate tube may be used. The intermediate tube is circular, or covers a portion of an arc of a circle around the ring, such that air is distributed in the inlets of the de-icing devices; it is called a circumferential tube. Multiple conveyance tubes may be interconnected to the circumferential tube such that hot air is diffused at different points. In this embodiment the circumferential tube includes multiple inlets to receive the air from the conveyance tubes, and multiple outlets interfacing with the air inlets of the de-icing devices.

According to different variant embodiments, the outlets of the circumferential tube interfacing with the inlets of the de-icing devices may have oblong, circular or again reniform sections.

In addition, additional fasteners may be added as required to strengthen and hold the hot air conveyance structure whilst preserving a certain flexibility in the seal which interconnects with the de-icing device. The fasteners of the circumferential tube may enable the circumferential tube to be attached to ferrule 7, for example in ring 9c.

Figure 9:
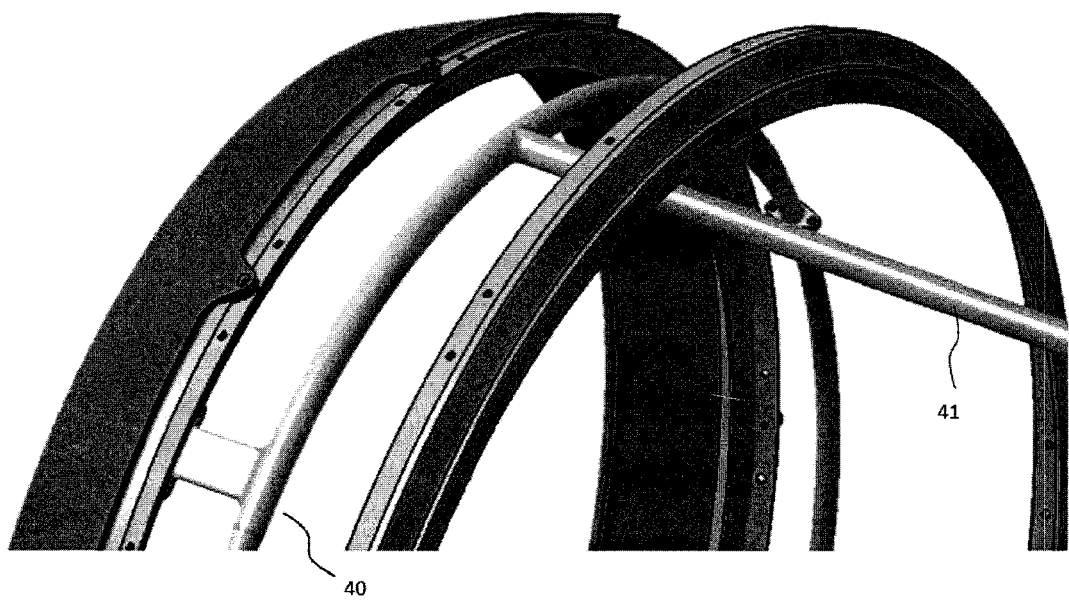
FIG. 9 represents a perspective view of an embodiment in which a circumferential tube and an air conveyance tube are represented.

According to one embodiment, the circumferential tube is a tube encircling the stator portion of the booster of the turbomachine. FIG. 9 represents a perspective view of an embodiment in which a circumferential tube 40 and an air conveyance tube 41 are represented. This embodiment allows an optimisation of the axial and circumferential flexibility of the air conveyance tubes and of the circumferential tube, which are assembled around the ring, and through the inlets of the de-icing devices.

The system's flexibility may be improved through the use of ball-joint connections enabling the outlets of the circumferential tube to be interconnected with the inlets of the de-icing devices.

The uniform distribution of the air is also due to the equivalent lengths which the hot air streams must travel from a compressor towards the separator, given that the lengths of the conveyance tubes are identical.

Identical conveyance tubes may be used, thereby facilitating design and installation of the system. In this case the heat or load losses are identical at all inlet points of the de-icing device.

When multiple intermediate tubes are used to interface with a circumferential tube, an improved embodiment of the invention enables tubes of identical length to be used so as to prevent load loss differentials.

In one variant embodiment a single conveyance tube is interconnected with the circumferential tube. In this latter case the circumferential tube has a single inlet and multiple outlets, to distribute the hot air from the conveyance tube in uniform fashion.

The solution of the circumferential tube allows a mechanical clearance which in particular facilitates a tolerance on thermal expansion. This clearance also facilitates installation of the system. In addition, it allows improved reaction of the mechanical parts with regard to the stresses.

The invention claimed is:

1. A turbomachine separator comprising a device for de-icing the turbomachine separator, and a distribution element, wherein the separator is formed by an inner ferrule and an outer ferrule, wherein the inner ferrule comprises a plurality of rings, and is fitted with a first mounting flange and a second mounting flange disposed separate from and axially aft of the first mounting flange, each mounting flange comprising a shoulder of one of the rings and a shoulder of an adjacent one of the rings, the de-icing device comprising:
    an internal air supply duct, adapted to inject air into the separator, wherein said internal supply duct is connected to an air inlet, wherein the air inlet forms a projection external to the de-icing device, allowing a flexible connection with a tube of the distribution element for conveying hot air,
    a first mounting plate, constructed and arranged to be attached to the first mounting flange at an outlet end of the de-icing device;
    second mounting plate, separate from the first mounting plate and constructed and arranged to be attached to the second mounting flange; and
    an outer wall, configured and arranged to, when the first and second mounting plates are attached to the respective first and second mounting flanges, engage an inner surface of the outer ferrule.

2. The separator according to claim 1, wherein the flexible connection is produced by fitting an air conveyance tube into the inlet of the de-icing device.

3. The separator according to claim 1, wherein the flexible connection is produced by a seal positioned in the air inlet such that the tube is fitted and held directly in the seal.

4. The separator according to claim 1, wherein the device forms a bridge clamp enabling a tube of diameter smaller than the diameter of the air inlet to be inserted.

5. The separator according to claim 1, including an air inlet connected to the inner air supply duct, wherein the air inlet can be connected to means to draw air from a compressor of the turbomachine.

6. The separator according to claim 1, wherein the de-icing device comprises an upper outer wall disposed such that the outer ferrule can be attached and supported on the upper outer wall and has two apertures, wherein each aperture is able to accept a captive nut.

7. The separator according to claim 1, including multiple de-icing devices positioned between two flanges at different circumferential positions, so as to convey air into the nozzle through different air inlets.

8. The separator according to claim 7, comprising a circumferential distribution element including multiple air outlets, enabling multiple de-icing devices to be supplied with air, and including multiple inlets to connect multiple air conveyance tubes.

9. The separator according to claim 8, wherein the distribution element is a circumferential tube encircling a ring of the stator close to one end of the secondary flange.

10. The separator according to claim 8, wherein each conveyance tube is of roughly identical length.

11. The separator according to claim 1, wherein the separator includes an outer ferrule formed by a plurality of panels, wherein at least a proportion of these panels is assembled with one another through the de-icing device.

12. A turbomachine including a separator according to claim 1.

* * * * *